United States Patent
Arnault et al.

(10) Patent No.: US 11,454,284 B2
(45) Date of Patent: Sep. 27, 2022

(54) COMBINED INSULATOR AND CONDUCTOR ASSEMBLY FOR BEARINGS WITH ENCASED INSULATOR

(71) Applicant: AKTIEBOLAGET SKF, Gothenburg (SE)

(72) Inventors: Benoit Arnault, Saint-Cyr-sur-Loire (FR); Nicolas Berruet, Artannes sur Indre (FR); Paul Feliciano, Saint Cyr-sur-Loire (FR); Mathieu Hubert, Turin (IT); Tommy Jullien, Ambillou (FR); Gene Kovacs, Brighton, MI (US); Thomas Perrotin, Saint Roch (FR); David Christopher Rybski, White Lake, MI (US); Anthony Simonin, Tours (FR); Collin Snyder, Northville, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/184,137

(22) Filed: Feb. 24, 2021

(65) Prior Publication Data

US 2021/0310520 A1    Oct. 7, 2021

(30) Foreign Application Priority Data

Apr. 3, 2020 (IT) .......................... 102020000007051

(51) Int. Cl.
*F16C 41/00* (2006.01)
*F16C 35/07* (2006.01)
(Continued)

(52) U.S. Cl.
CPC ............ *F16C 41/002* (2013.01); *F16C 19/52* (2013.01); *F16C 35/077* (2013.01); *H02K 5/173* (2013.01);
(Continued)

(58) Field of Classification Search
CPC ...... F16C 19/52; F16C 35/077; F16C 41/002; F16C 2202/24; F16C 2202/32;
(Continued)

(56) References Cited

U.S. PATENT DOCUMENTS 4,801,270 A * 1/1989 Scarlata ................ F16C 41/002
439/95
5,735,615 A * 4/1998 Pontzer ................... F16C 35/00
384/476
(Continued)

FOREIGN PATENT DOCUMENTS

DE    202014105015 U1    10/2014
DE    102017106695 B3     4/2018
(Continued)

OTHER PUBLICATIONS

Unpublished U.S. Appl. No. 17/102,636.
(Continued)

*Primary Examiner* — Alan B Waits
(74) *Attorney, Agent, or Firm* — J-Tek Law PLLC; Scott T. Wakeman; Mark A. Ussai (57) ABSTRACT

A combined insulator and conductor assembly for a bearing disposable between a shaft and a housing includes an annular insulator disposeable about the bearing outer ring and having inner and outer circumferential surfaces and formed of an electrically insulative material or having one or more insulative layers to prevent electric current flow between the outer ring and the housing. A conductive carrier includes a cylindrical portion having an inner surface disposed about the insulator outer surface and an outer surface disposeable against the housing inner surface and a disk portion extending radially inwardly from the cylindrical portion having an inner radial end spaced outwardly from the shaft. An annular conductive brush subassembly is coupled with the carrier disk portion and includes a plurality (Continued)

of electrically conductive fibers contactable with the shaft outer surface to provide a conductive path between the shaft and the carrier, and thereafter to the housing.

12 Claims, 7 Drawing Sheets

(51) Int. Cl.
    *F16C 19/52*         (2006.01)
    *F16C 35/077*       (2006.01)
    *H02K 5/173*        (2006.01)

(52) U.S. Cl.
    CPC ...... *F16C 2202/24* (2013.01); *F16C 2202/32* (2013.01)

(58) Field of Classification Search
    CPC ........ H02K 5/145; H02K 5/173; H02K 11/40; H02K 13/10; H01R 39/39; H01R 39/643; H01R 4/64
    See application file for complete search history.

(56) References Cited

U.S. PATENT DOCUMENTS

| | | | |
|---|---|---|---|
| 7,528,513 | B2 | 5/2009 | Oh |
| 10,050,490 | B1 | 8/2018 | Hubert et al. |
| 10,253,818 | B1 | 4/2019 | Ince et al. |
| 10,422,384 | B2 | 9/2019 | Hubert et al. |
| 10,931,179 | B2 | 2/2021 | Hubert et al. |
| 11,204,066 | B2 | 12/2021 | Feliciano et al. |
| 2003/0086630 | A1* | 5/2003 | Bramel .................. H02K 11/40 384/476 |
| 2005/0265643 | A1 | 12/2005 | Alsina et al. |
| 2014/0131512 | A1 | 5/2014 | Gyuricsko |
| 2016/0312834 | A1* | 10/2016 | White .................. F16C 33/586 |
| 2019/0226526 | A1 | 7/2019 | Hubert et al. |
| 2019/0296617 | A1 | 9/2019 | Hubert et al. |
| 2020/0224719 | A1 | 7/2020 | Colton et al. |
| 2021/0310517 | A1 | 10/2021 | Berruet et al. |
| 2021/0310518 | A1 | 10/2021 | Berruet et al. |
| 2021/0310520 | A1 | 10/2021 | Arnault et al. |
| 2021/0364040 | A1 | 11/2021 | Arnault et al. |
| 2021/0364041 | A1 | 11/2021 | Berruet et al. |

FOREIGN PATENT DOCUMENTS

| | | |
|---|---|---|
| DE | 102019200397 A1 | 7/2019 |
| FR | 1325720 A | 5/1963 |
| JP | 2015095440 A | 5/2015 |
| WO | 2016171929 A1 | 10/2016 |

OTHER PUBLICATIONS

Written Opinion and Search Report from the Italian Patent Office dated Dec. 11, 2020 in related Italian application No. 102020000007057, and translation thereof.
Written Opinion and Search Report from the Italian Patent Office dated Dec. 23, 2020 in related Italian application No. 102020000007054, and translation thereof.
Written Opinion and Search Report from the Italian Patent Office dated Mar. 9, 2021 in related Italian application No. 102020000012151, and translation thereof.
Written Opinion and Search Report from the Italian Patent Office dated Feb. 24, 2021 in related Italian application No. 102020000012145, and translation thereof.
Unpublished U.S. Appl. No. 17/210,168.
Unpublished U.S. Appl. No. 17/210,139.
Written Opinion and Search Report from the Italian Patent Office dated Nov. 11, 2020 in related Italian application No. 102020000007051, and translation thereof.

\* cited by examiner

COMBINED INSULATOR AND CONDUCTOR ASSEMBLY FOR BEARINGS WITH ENCASED INSULATOR

CROSS-REFERENCE

This application claims priority to Italian Patent Application No. 102020000007051, filed Apr. 3, 2020 the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

In one aspect, the present invention is a combined electrically insulator and conductive assembly for a bearing disposable between a shaft and a housing. The bearing has an inner ring, an outer ring with opposing first and second axial ends, and a plurality of rolling elements between the rings, the shaft having an outer circumferential surface and the housing having an inner circumferential surface. The assembly comprises an annular insulator disposeable about the bearing outer ring and having an inner circumferential surface and an outer circumferential surface. The insulator is formed of an electrically insulative material or is provided with an insulative layer on at least one of the inner and outer surfaces to substantially prevent electric current flow between the inner and outer rings. An annular conductor has an outer radial end, the outer end being disposed at least partially about the insulator and engageable with the housing inner surface, and an inner radial end engageable with the shaft outer surface so as to provide a conductive path between the shaft and the housing through the conductor inner and outer radial ends.

Preferably, the conductor includes an electrically conductive carrier including a cylindrical portion, the cylindrical portion having an inner circumferential surface disposed about the insulator outer surface and an outer circumferential surface disposeable against the housing inner surface, and a disk portion. The disk portion extends radially inwardly from the cylindrical portion so as to be axially adjacent to the bearing inner and outer rings, the disk portion having an inner radial end spaced radially outwardly from the shaft and defining a central opening. Further, an annular conductive brush subassembly is coupled with the carrier disk portion, has a centerline and includes a plurality of electrically conductive fibers. The conductive fibers are spaced circumferentially about the centerline and extend radially inwardly from the inner end of the carrier disk portion. Each conductive fiber has an inner end contactable with the shaft outer surface so as to provide the conductive path between the shaft and the carrier, the path extending through the carrier to the housing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

BRIEF DESCRIPTION OF THE SEVERAL VIEWS OF THE DRAWINGS

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
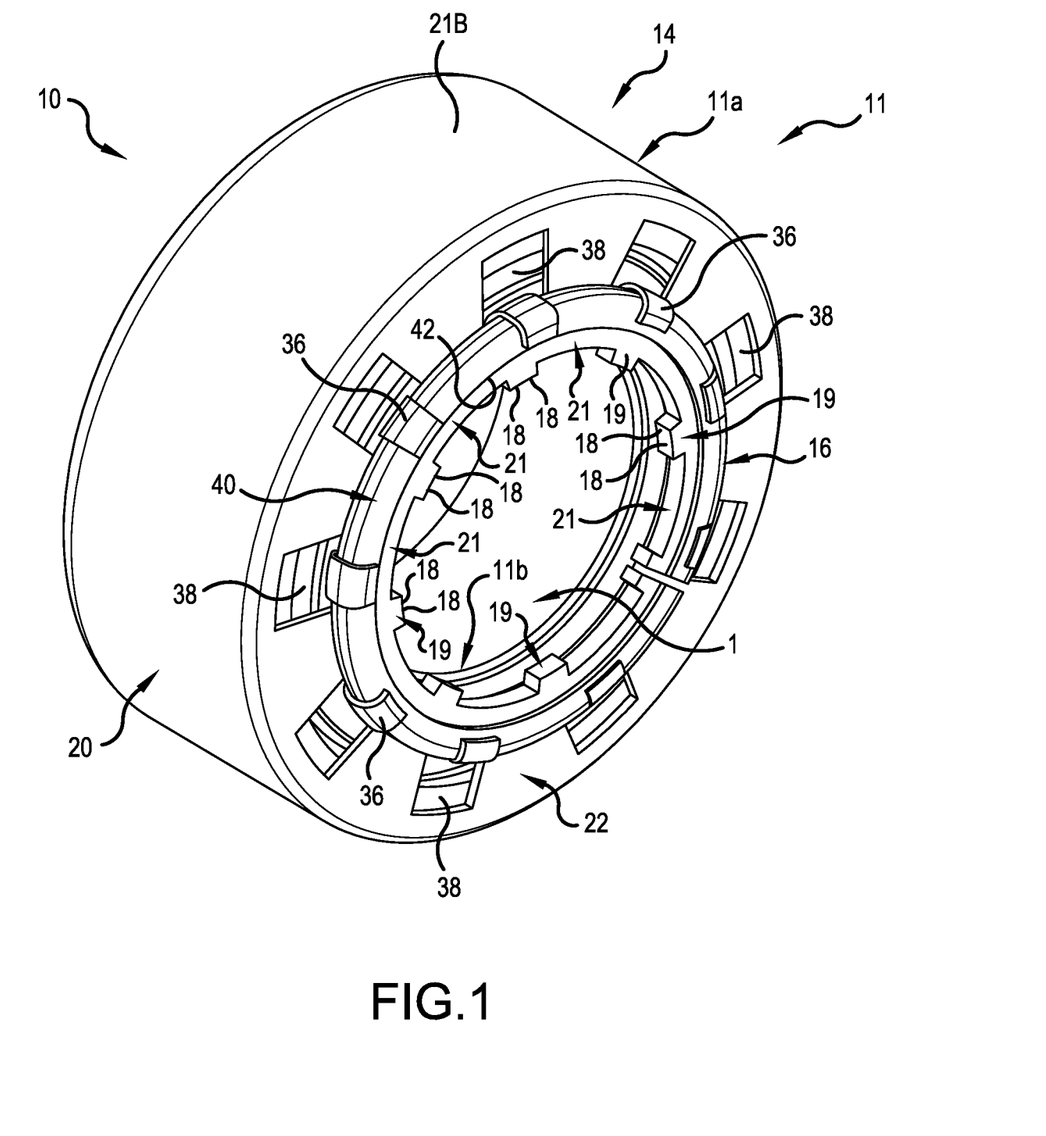
FIG. 1 is a perspective view of a combined insulator and conductor assembly in accordance with the present invention, shown installed on a bearing.
Figure 2:
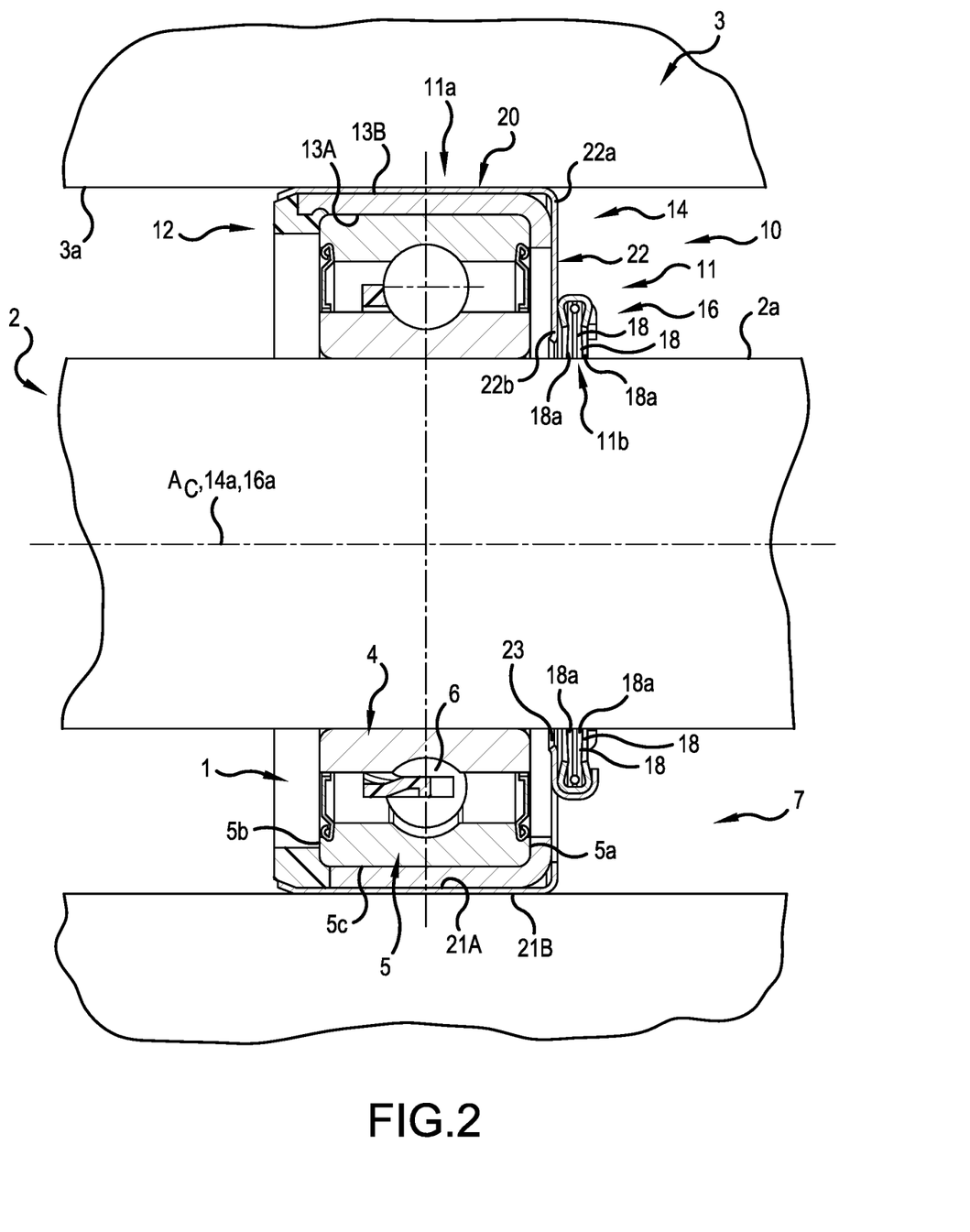
FIG. 2 is an axial cross-sectional view of the combined insulator and conductor assembly, shown installed on a shaft and within a housing.
Figure 3:
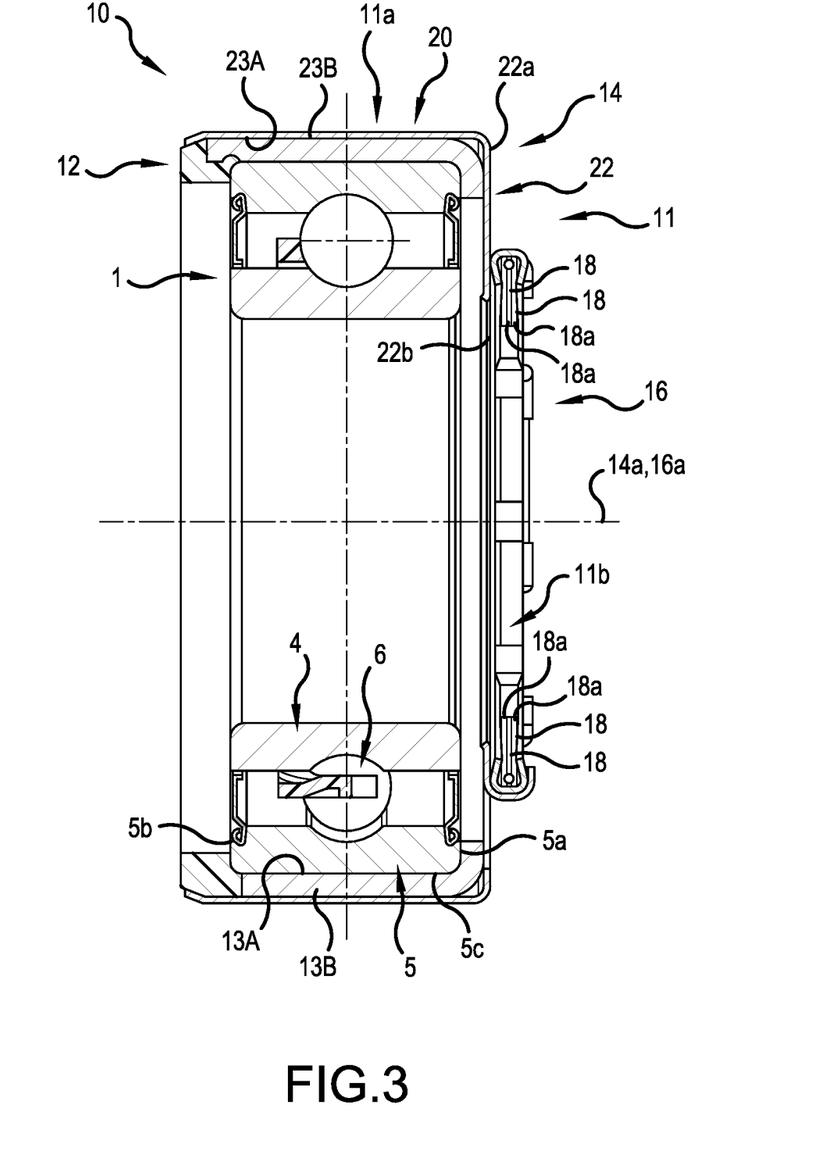
FIG. 3 is an axial cross-sectional view of the combined insulator and conductor assembly.

Referring now to the drawings in detail, wherein like numbers are used to indicate like elements throughout, there is shown in FIGS. 1-9 a combined electrical insulator and conductor assembly 10 for a bearing 1 disposable between a shaft 2 and a housing 3, as shown in FIG. 2. The bearing 1 has an inner ring 4, an outer ring 5 with opposing first and second axial ends 5a, 5b, and a plurality of rolling elements 6 between the rings 4 and 5. The shaft 2 is rotatable about a central axis $A_C$ and has an outer circumferential surface 2a and the housing 3 has an inner circumferential surface 3a defining a bore 7. Preferably, the bearing 1, the shaft 2 and the housing 3 are components of a motor or other electrical machine (e.g., a generator) or any other machine having rotating components likely to accumulate electric charge or convey electric current. The combined insulator and conductor assembly 10 basically comprises an annular insulator 12 disposeable about the bearing outer ring 5 and configured to prevent electric current flow between the outer ring 5 and the housing 3 and an annular conductor 11 disposed at least partially about the insulator 12 and configured to provide a conductive path between the shaft 2 and the housing 3.

More specifically the insulator 12 has an inner circumferential surface 13A and an outer circumferential surface 13B and is either formed of an electrically insulative material (e.g., a polymer, a ceramic, etc.) or provided with an insulative layer (e.g., aluminum with an anodized layer(s)) on at least one of the inner and outer surfaces 13A, 13B. As such, the insulator 12 substantially prevents electric current flow between the outer ring 5 and the housing 3, thereby preventing current flow through the bearing inner and outer rings 4, 5 as such current is particularly detrimental to the bearing raceways (not indicated). The insulator 11 has an outer radial end 11a disposed at least partially about the insulator 12 and engageable with the housing inner surface 3a, and an inner radial end 11b engageable with the shaft outer surface 2a so as to provide the conductive path between the shaft 2 and the housing 3 through the conductor inner and outer radial ends 11b, 11a, respectively. Additionally or alternatively, one or more conductive paths may be provided by engagement of a portion of the conductor 11 located between the outer and inner radial ends 11a, 11b, respectively, with either a portion of the housing 3 or a machine component (e.g., a spring, a pin, etc.) disposed within the housing 3, as discussed below.

Preferably, the conductor 11 includes an electrically conductive carrier 14 coupled with the insulator 12 and a brush subassembly 16 coupled with the carrier 14 and having a plurality of conductive fibers 18 contactable with the shaft 2, the carrier 14 and the brush subassembly forming the conductor 11. The conductive carrier 14 has a centerline 14a and includes a cylindrical portion 20 disposed about the bearing outer ring 5 and a disk portion 22 extending radially inwardly from the cylindrical portion 20 so as to be axially adjacent to the bearing inner and outer rings 4, 5. The carrier cylindrical portion 20 has an inner circumferential surface 21A disposed about the insulator outer surface 13B, such that the insulator 12 is encased by the conductor 11, and an outer circumferential surface 21B disposeable against the housing inner surface 3a, preferably frictionally engageable to axially fix the bearing 1 with respect to the housing 3. The carrier outer circumferential surface 21B is also "conductively engageable", i.e., engageable to permit electric current flow, with the housing inner surface 3a to provide a portion of the conductive path from the shaft 2 to the housing 3. Further, the disk portion 22 has an outer radial end 22a integrally formed with the cylindrical portion 20 and an inner radial end 22b spaced radially outwardly from the shaft 2 and defining a central opening 23 (FIG. 2) for receiving a portion of the shaft 2.

Furthermore, the annular conductive brush subassembly 16 is coupled with the carrier disk portion 22 and includes a centerline 16a and the plurality of electrically conductive fibers 18 are spaced circumferentially about the centerline 16a. The conductive fibers 18 are preferably formed of carbon and extend radially inwardly from the inner end 22b of the carrier disk portion 22. Each conductive fiber 18 has an inner end 18a contactable with the shaft outer surface 2a so as to provide a conductive path between the shaft 2 and the carrier 14. As the carrier 14 is configured to provide a conductive path between the brush subassembly 16 and the housing 3, any current or charge on the shaft 2 is directed to flow through the assembly 10, rather than through the bearing 1. Thus, the combined insulator and conductor assembly 10 functions to protect the bearing 10 both by preventing direct current flow through the bearing 1 (i.e., due to the insulator 12) and by providing an alternative path for current adjacent to the bearing 1 by means of the brush subassembly 16 and the conductive carrier 14. Having described in basic structure and functions above, these and other components of the assembly are discussed in detail below.

Figure 4:
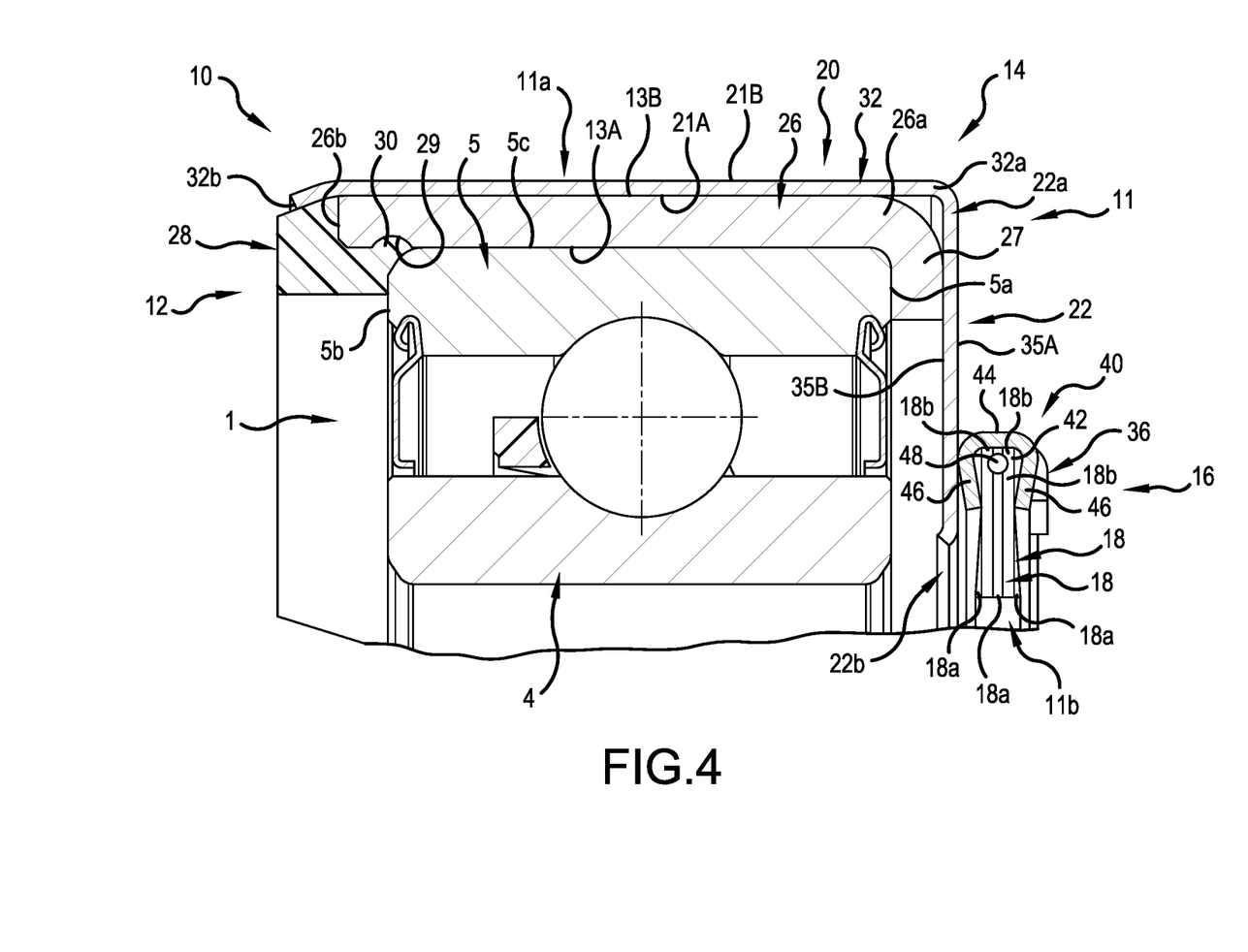
FIG. 4 is a broken-away, enlarged view of an upper portion of FIG. 3.
Figure 5:
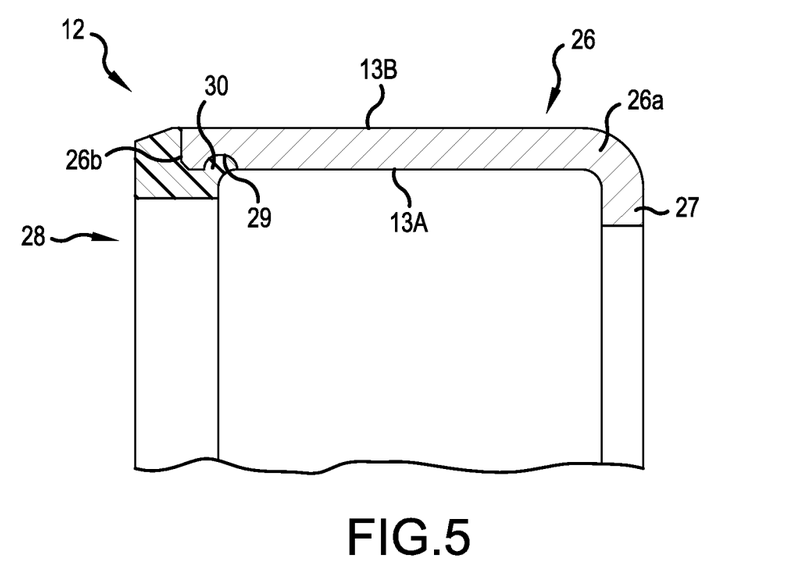
FIG. 5 is a broken-away, axial cross-sectional view of an insulator.
Figure 6:
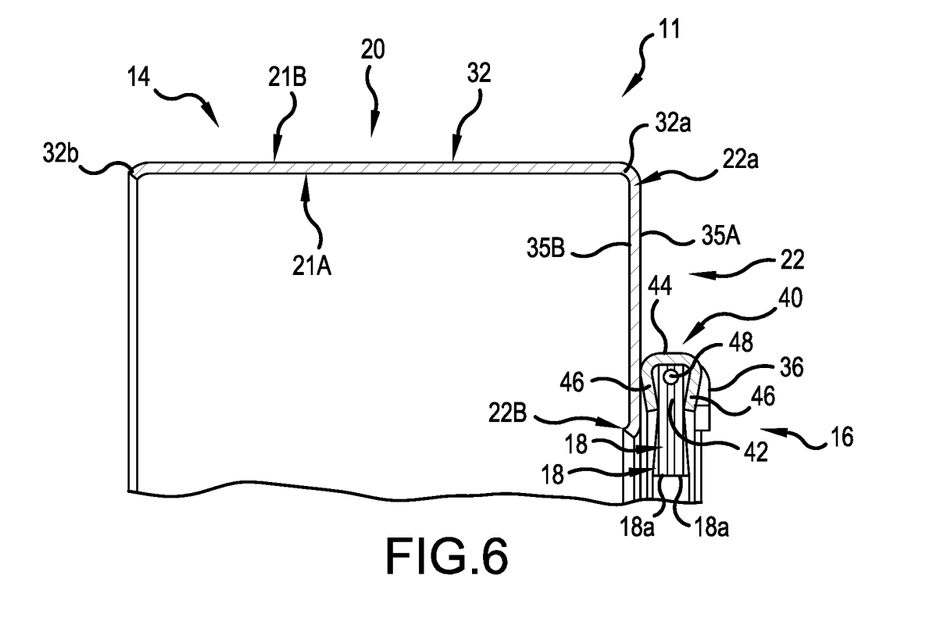
FIG. 6 is a broken-away, axial cross-sectional view of a conductive carrier and brush subassembly.
Figure 7:
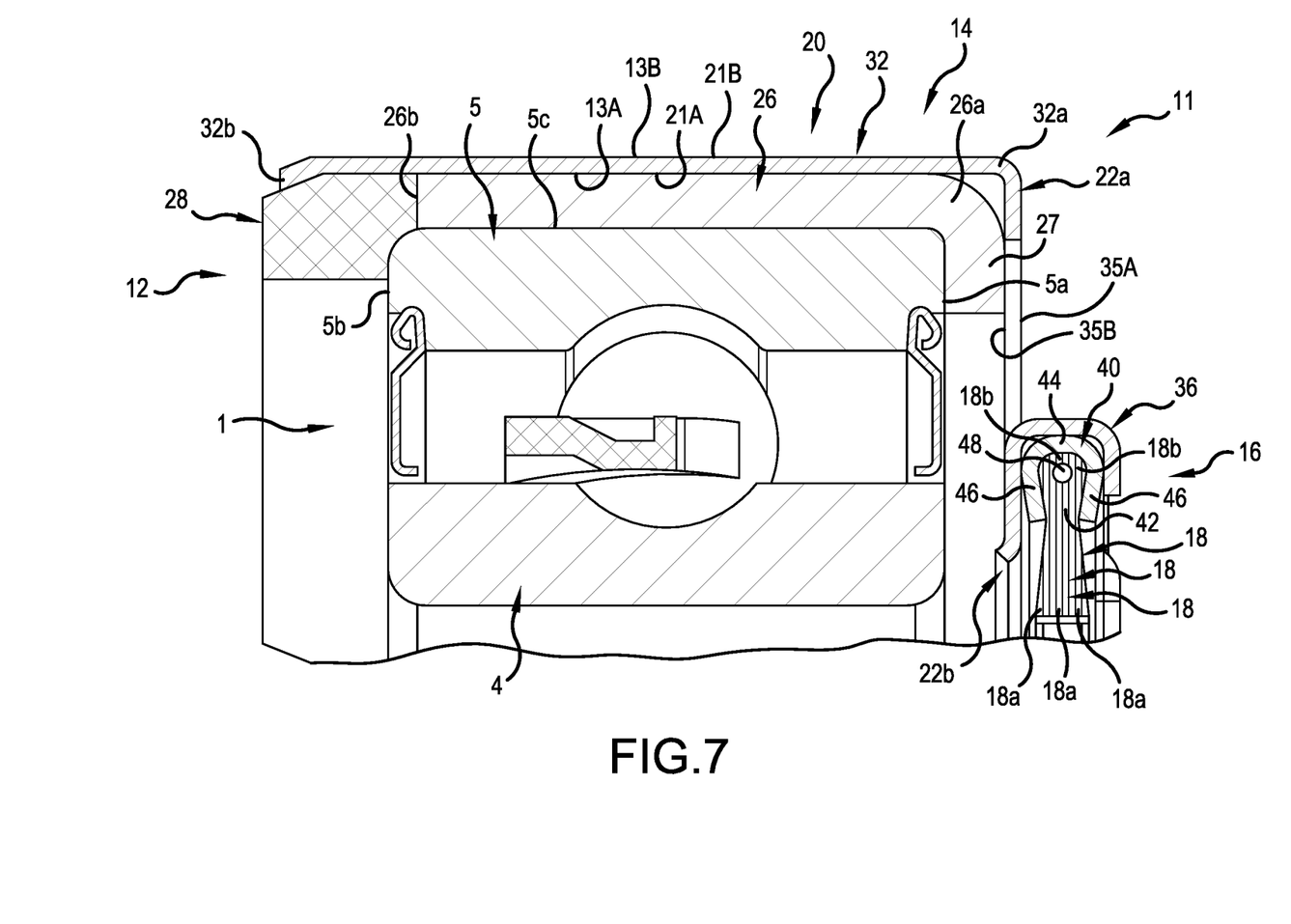
FIG. 7 is a broken-away, enlarged view of the combined insulator and conductor assembly, showing an alternative construction of the insulator.
Figure 8:
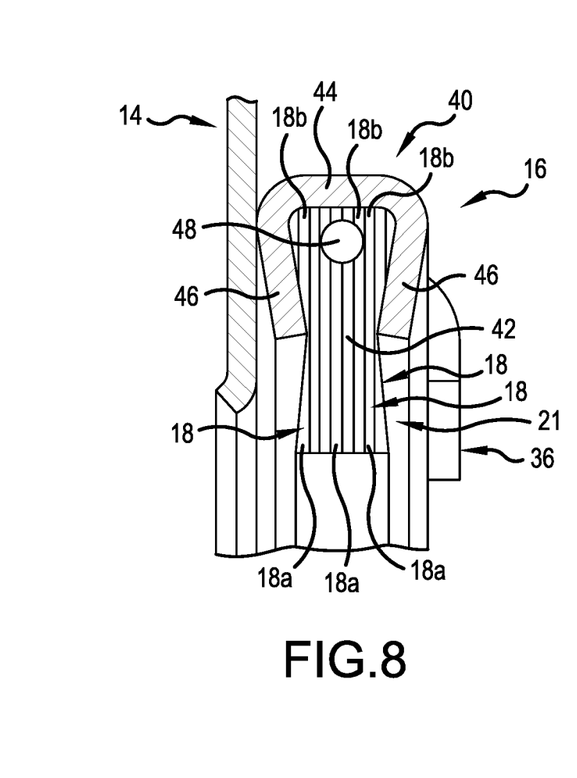
FIG. 8 is a broken-away, enlarged view of the brush subassembly, taken through a set of relatively shorter conductive fibers.

Referring now to FIGS. 4, 5 and 7, the insulator 12 preferably includes a main cylindrical body 26 and an end ring 28 connected with the cylindrical body 26. The cylindrical body 26 provides the insulator inner and outer surfaces 13A, 13B and has opposing first and second axial ends 26a, 26b. A flange 27 extends radially inwardly from the body first axial end 26a and is disposable between the first axial end of 5a of the bearing outer ring 5 and the disk portion 22 of the carrier 14 to prevent current passing through the carrier 14 from flowing into the outer ring 5. The end ring 28 is disposeable against the second axial end 5b of the bearing outer ring 5 to insulate the end 5b from conductive contact with the housing 3 or another machine component (none depicted) disposed within the housing 3.

Preferably, the main cylindrical body 26 has an annular groove 29 adjacent to the second axial end 26a and the end ring 28 has an annular projection 30 disposed within the annular groove 29 to couple the end ring 28 with the cylindrical body 26, as best shown in FIGS. 4 and 5. Alternatively, as depicted in FIG. 7, the insulator 12 may be formed without the groove and projection, with the carrier cylindrical portion 20 being configured to retain the insulator end ring 28 coupled with the insulator cylindrical body 26, specifically by forming or "deforming" the cylindrical portion 20 closely about the two components 26, 28. Further, the insulator cylindrical body 26 is preferably formed of aluminum with at least one layer of anodization and the end ring 28 is preferably formed of a rigid polymeric material (e.g., nylon, PVC, etc.). However, either the cylindrical body 26 or the end ring 28 may be formed of any other appropriate material capable of preventing electric current flow.

Referring now to FIGS. 1, 4, 6 and 7, the cylindrical portion 20 of the conductive carrier 14 is preferably formed of a relatively thin circular shell 32 with opposing first and second axial ends 32a, 32b, the first axial end 32a being integrally formed with the plate portion outer end 22a as discussed above, and the second end 32b being disposed about the end ring 28. The carrier disk portion 22 is preferably formed as a relatively thin circular plate 34, with the two portions 20, 22 preferably being formed as a one-piece stamping. Also, the disk portion 22 has opposing first and second end surfaces 35A, 35B extending radially between the inner and outer radial ends 22a, 22b, the brush subassembly 16 being connected with the first end surface 35A and the second end surface 35B being disposed against the insulator flange 27. Further, the carrier disk portion 22 preferably includes a plurality of mounting tabs 36 spaced circumferentially about the carrier centerline 14a, each mounting tab 36 being engaged with the brush subassembly 16 to couple the subassembly 16 with the carrier 14.

Preferably, each mounting tab 36 is formed by cutting (e.g., by die punching) through the disk portion 22 to form a rectangular tab 36 and a clearance opening 38, the tab 36 being bended about a retainer 40 of the brush subassembly 16, as described below, such that each mounting tab 36 is generally C-shaped. The clearance openings 38 provide passages for fluids (e.g., lubricants, air, etc.) to flow through the carrier 14 so as to pass to and from the bearing 1. Further, the carrier 14 is preferably formed of a metallic material, most preferably aluminum, but may be formed of any other metallic material (e.g., steel), a conductive polymer, etc.

Referring now to FIGS. 1, 4 and 6-9, the conductive brush subassembly 16 preferably includes the annular retainer 40 connected with the carrier 14, as described above, and having an open inner radial end 40a with an annular groove 42 and a closed outer end 40b. Each one of the plurality of conductive fibers 18 has an outer radial end 18b disposed within the groove 42 and extends radially inwardly from the retainer 40 and toward the shaft 2. More specifically, the retainer 40 has an outer axial base 44 and two opposing radial legs 46, such that retainer 40 has generally C-shaped axial cross-sections. The retainer legs 46 preferably clamp against the outer ends 18b of the conductive fibers 18 to retain the fibers 18 within the groove 42.

Further, the brush subassembly 16 preferably includes a circular hoop 48 disposed within the retainer groove 42 and each one of the plurality of conductive fibers 18 is bended about the hoop 44. As such, each conductive fiber 18 is preferably generally U-shaped or V-shaped and has two inner ends 18a contactable with the shaft outer surface 2a. However, each one of the conductive fibers 18 may be arranged to extend as a generally straight strand (not shown) from the outer radial end 18b to the inner radial end 18a.

Figure 9:
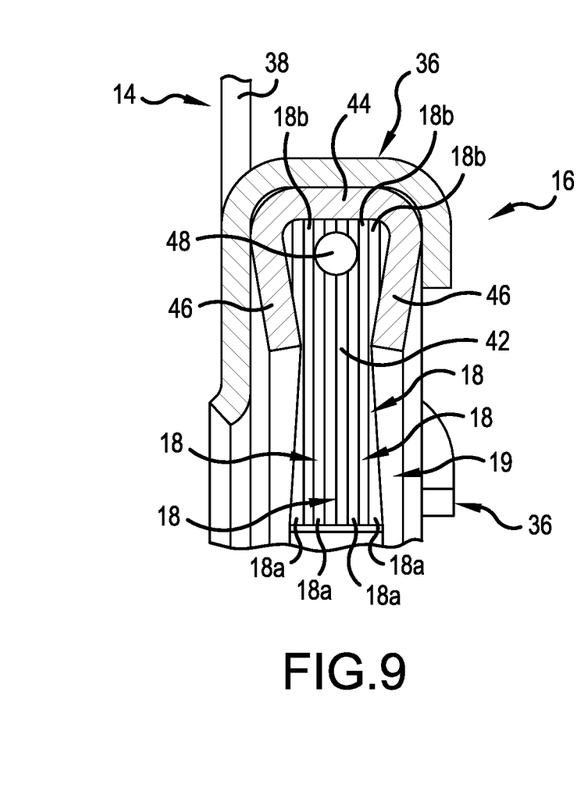
FIG. 9 is another broken-away, enlarged view of the brush subassembly, taken through a set of relatively larger conductive fibers.

Furthermore, the plurality of conductive fibers 18 of the brush subassembly 16 are either arranged in a generally continuous ring of fibers (not shown) or preferably as a plurality of circumferentially spaced discrete sets 19 of fibers 18, as indicated in FIGS. 1 and 9. In the latter preferred case, the sets 19 of fibers 18 are preferably formed by die-cutting a brush assembly 16 including a continuous ring of fibers 18 such that the fiber sets 19 contactable with the shaft 2 are spaced apart by sets 21 of shorter length fibers 18. Also, each conductive fiber 18 is preferably sized having a diameter within the range of five micrometers or microns (5 μm) to one hundred microns (100 μm). Although each conductive fiber 18 is preferably formed of carbon as discussed above, the fibers 18 may alternatively be fabricated of any appropriate electrically conductive material, such as a metallic material, a conductive polymer, etc.

Although the conductor 11 preferably includes the carrier 14 and the brush subassembly 16 as described above and depicted in the drawing figures, the conductor 11 may be alternatively be formed in any other appropriate manner that is both coupleable with the insulator 12 and capable of providing one or more conductive paths between the shaft 2 and the housing 3. For example, the conductor 11 may include, instead of the brush subassembly 16, a solid ring of a conductive material (not shown) attached to the carrier 14 and conductively engageable with the shaft 2, the ring having either a continuous inner circumferential contact surface or a plurality of arcuate contact surface sections provided by radially-inwardly extending projections. As a further alternative, the disk portion 22 of the conductive carrier 14 may be formed having an inner end 22b contactable with the shaft outer surface 2a to provide a direct conductive path between the shaft 2 and the disk portion 22. The scope of the present invention encompasses these and all other appropriate constructions of the conductor 11 capable of functioning generally as described herein.

Prior to assembly of the bearing 1 into the housing 3, the insulator and conductor assembly 10 is installed on the bearing 1 as follows. The insulator 12 is installed on the bearing outer ring 5 inserting the ring first axial end 5a into the second axial end 26b of the cylindrical body 26 and sliding the inner surface 13A of the body 26 over the ring outer surface 5c until the flange 27 is disposed against the ring first axial end 5a. Then, the end ring 28 is positioned on the second axial end 5b of the bearing outer ring 5, and in certain embodiments, the ring projection 30 is inserted into the groove 29 of the cylindrical body 26 to couple the ring 28 with the body 26, as shown in FIG. 5. Next, the conductive carrier 14 of the conductor 11, with the brush subassembly 16 preinstalled thereon, is coupled with the insulator 12 by inserting the first axial end of the insulator 26a into second axial end 32b of the carrier cylindrical portion 20 and sliding the inner surface 21A of the carrier cylindrical portion 20 over the insulator outer surface 13B until the carrier disk portion 22 is disposed against the insulator flange 27. At this point, the bearing 1 with the insulator and conductor assembly 10 may be installed on the shaft 2 and within the housing 3.

The insulator/conductor assembly 10 of the present invention is more effective at protecting a bearing 1 from damage caused by electric current than previously known devices. The insulator 12 effectively prevents a voltage difference from being established between the shaft 2 and the housing 3 through the bearing 1, such that electric current is prevented from flowing through the inner and outer rings 4, 5 and the rolling elements 6. To further assure that electric current will not pass through the bearing 1, the conductive carrier 14 and the brush subassembly 16 provide an alternative path for any charge or current on the shaft 2 to pass through the conductive fibers 18 to the retainer 40, through the retainer 40 and into the carrier disk portion 22, then passing through the carrier cylindrical portion 20 and into the housing 3.

Additional or alternative conductive paths into the housing 3 may be provided by axial contact between a portion of the housing 3 (e.g., a radial shoulder) or a component of the machine disposed within the housing 3, such as a spring, a pin, etc., and either a surface of the carrier disk portion 22 (e.g., the radial end surface 35A, the tabs 36, etc.) or/and of the annular retainer 40. Thus, any charge or current on the shaft 2 in the region of the bearing 1 is both prevented from passing through the bearing 1 by the insulator 12 and shunted to pass through the brush subassembly 16 and the conductive carrier 14 of the conductor 11. Further, the assembly 10 may be installed on the bearing 1 by a manufacturer or a distributor, such that a bearing 1 with combined insulator and conductor assembly 10 may be provided to a customer or end user as an entire assembly ready to be installed on a shaft 2 and within a housing 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. The invention is not restricted to the above-described embodiments and may be varied within the scope of the following claims.

We claim:

1. A combined insulator and conductor assembly for a bearing disposable between a shaft and a housing, the bearing having an inner ring, an outer ring with opposing first and second axial ends, and a plurality of rolling elements between the rings, the shaft having an outer circumferential surface and the housing having an inner circumferential surface, the insulator and conductor assembly comprising:
   an annular insulator configured to be disposed about the bearing outer ring and to prevent electric current flow between the outer ring and the housing; and
   an annular conductor having a conductive carrier including a cylindrical portion disposed at least partially about the insulator and configured to engage with the housing inner surface and a disk portion integrally formed with and extending radially inwardly from the cylindrical portion so as to be disposeable axially adjacent to the bearing rings, and an annular conductive brush subassembly attached to the disk portion of the carrier and having a radial inner end configured to contact the shaft so as to provide a conductive path between the shaft and the housing through the conductor.

2. The insulator and conductor assembly as recited in claim 1 wherein the insulator has an inner circumferential surface and an outer circumferential surface, the insulator being formed of an electrically insulative material or provided with an insulative layer on at least one of the inner and outer surfaces.

3. The insulator and conductor assembly as recited in claim 1 wherein the insulator includes:
   a main cylindrical body having opposing first and second axial ends and a flange extending radially inwardly from the first axial end and configured to be disposed between the first axial end of the bearing outer ring and the disk portion of the carrier; and
   an end ring connected with the second axial end of the cylindrical body and configured to be disposed against the second axial end of the bearing outer ring.

4. The insulator and conductor assembly as recited in claim 3 wherein the main cylindrical body has an annular groove adjacent to the second axial end and the end ring has an annular projection disposed within the annular groove to couple the end ring with the cylindrical body.

5. The insulator and conductor assembly as recited in claim 1 wherein:
   the cylindrical portion of the conductive carrier has an inner circumferential surface disposed about the insulator outer surface and an outer circumferential surface configured to be disposed against and to conductively engage with the housing inner surface, and the disk portion has an inner radial end spaced radially outwardly from the shaft and defining a central opening configured to receive a portion of the shaft; and
   the annular conductive brush subassembly includes a centerline and a plurality of electrically conductive fibers, the conductive fibers being spaced circumferentially about the centerline and extending radially inwardly from the inner end of the carrier disk portion, each conductive fiber having an inner end contactable with the shaft outer surface so as to provide a conductive path between the shaft and the carrier.

6. The insulator and conductor assembly as recited in claim 5 wherein the carrier has a centerline and the carrier disk portion includes a plurality of mounting tabs spaced circumferentially about the centerline, each mounting tab being engaged with the brush subassembly to couple the subassembly with the carrier.

7. The insulator and conductor assembly as recited in claim 5 wherein the carrier cylindrical portion is formed of a shell having an outer circumferential surface configured to frictionally engage with the housing inner surface to axially retain the bearing within the housing.

8. The insulator and conductor assembly as recited in claim 5 wherein:
   the insulator includes a main cylindrical body, the cylindrical body having opposing first and second axial ends and a flange extending radially inwardly from the first axial end and configured to be disposed between the first axial end of the bearing outer ring and the disk portion of the carrier, and an end ring connected with the second axial end of the cylindrical body and configured to be disposed against the second axial end of the bearing outer ring; and
   the carrier cylindrical portion is configured to retain the insulator end ring coupled with the insulator cylindrical body.

9. The insulator and conductor assembly as recited in claim 5 wherein the conductive brush subassembly includes an annular retainer connected with the carrier and having an inner radial end with an annular groove, each one of the plurality of conductive fibers having an outer radial end disposed within the groove and extending radially inwardly from the retainer and toward the shaft.

10. The insulator and conductor assembly as recited in claim 5 wherein at least one of:
   the brush subassembly further includes a circular hoop disposed within the retainer and each one of the plurality of conductive fibers is bended about hoop such that each fiber has two ends configured to contact the shaft outer surface; and
   the plurality of conductive fibers of the brush subassembly are arranged in a plurality of circumferentially spaced discrete sets of fibers.

11. A combined insulator and conductor assembly for a bearing disposable between a shaft and a housing, the bearing having an inner ring, an outer ring with opposing first and second axial ends, and a plurality of rolling elements between the rings, the shaft having an outer circumferential surface and the housing having an inner circumferential surface, the insulator and conductor assembly comprising:
   an annular insulator configured to be disposed about the bearing outer ring and to prevent electric current flow between the outer ring and the housing, the insulator including a main cylindrical body having opposing first and second axial ends and a flange extending radially inwardly from the first axial end so as to be disposable adjacent to the first axial end of the bearing outer ring and an end ring connected with the second axial end of the cylindrical body and configured to be disposed against the second axial end of the bearing outer ring; and an annular conductor having an outer radial end, the outer end being disposed at least partially about the insulator and configured to engage with the housing inner surface, and an inner radial end configured to engage with the shaft outer surface so as to provide a conductive path between the shaft and the housing through the conductor inner and outer radial ends.

12. A combined insulator and conductor assembly for a bearing disposable between a shaft and a housing, the bearing having an inner ring, an outer ring with opposing first and second axial ends, and a plurality of rolling elements between the rings, the shaft having an outer circumferential surface and the housing having an inner circumferential surface, the insulator and conductor assembly comprising:

an annular insulator configured to be disposed about the bearing outer ring and to prevent electric current flow between the outer ring and the housing; and an annular conductor having an outer radial end, the outer end being disposed at least partially about the insulator and configured to engage with the housing inner surface, and an inner radial end configured to engage with the shaft outer surface so as to provide a conductive path between the shaft and the housing through the conductor inner and outer radial ends;

wherein the conductor includes:

a conductive carrier having a cylindrical portion providing the conductor outer radial end, the cylindrical portion having an inner circumferential surface disposed about the insulator outer surface and an outer circumferential surface configured to be disposed against and conductively engage with the housing inner surface, and a disk portion extending radially inwardly from the cylindrical portion so as to be axially adjacent to the bearing inner and outer rings, the disk portion having an inner radial end spaced radially outwardly from the shaft and defining a central opening configure to receive a portion of the shaft; and an annular conductive brush subassembly coupled with the carrier disk portion and including a centerline and a plurality of electrically conductive fibers, the conductive fibers being spaced circumferentially about the centerline and extending radially inwardly from the inner end of the carrier disk portion, each conductive fiber having an inner end configured to contact the shaft outer surface so as to provide a conductive path between the shaft and the carrier.

* * * * *